United States Patent [19]
Clarke et al.

[11] 3,818,958
[45] June 25, 1974

[54] SELF-LOCKING HOLDBACK CLEAT

[75] Inventors: George E. Clarke, Lexington;
Warren E. Krumke, Tall Timbers,
both of Md.

[73] Assignee: The United States of America as represented by the Secretary of the Navy, Washington, D.C.

[22] Filed: July 19, 1973

[21] Appl. No.: 380,643

[52] U.S. Cl. ............ 244/116, 105/368 J, 105/369 A, 248/361 A
[51] Int. Cl. ............................................. B64f 1/12
[58] Field of Search ............ 244/116, 115, 114, 63, 244/110 F, 110 G, 110 R; 105/369 A, 368 T; 248/361 A; 280/179 A

[56] References Cited
UNITED STATES PATENTS
1,776,511  9/1930  Kinney .............................. 244/115
2,962,245  11/1960  Molzan et al. ...................... 244/115
3,212,457  10/1965  Looker .......................... 244/115 X

*Primary Examiner*—Trygve M. Blix
*Assistant Examiner*—Paul E. Sauberer
*Attorney, Agent, or Firm*—R. S. Sciascia; P. Schneider

[57] ABSTRACT

A self-locking, holdback cleat to restrain an aircraft during high power engine run-ups. The cleat has two pieces—a shoe, attached to the aircraft via a dragchain, and a deck plate. The shoe has a spool-type button mounted thereon, which drags along the ground as the aircraft moves into position and engages the fixedly mounted deck plate. The deck plate has ramped under-cutting forming a vertical labyrinth which guides the button into locking engagement. When tension is released from the chain, the button may be manually released from the deck plate.

10 Claims, 3 Drawing Figures

PATENTED JUN 25 1974         3,818,958

SELF-LOCKING HOLDBACK CLEAT

BACKGROUND OF THE INVENTION

The present invention relates generally to self-locking, holdback devices and more specifically to a self-locking, holdback cleat.

Before take-off and for various maintenance purposes, aircraft are often required to complete a high-power, engine run-up. Without a holdback device a run-up in excess of 55 percent of the maximum rpm of an engine is often impossible, since such power often exceeds the breaking capability of the aircraft. Holdback devices employed in the past used a restraint system which involved multiple tie-down points at several fuselage locations. Such systems required extremely accurate location of the aircraft, several bolted connections, and totally lacked automatic hook-up or rapid removal capability.

SUMMARY OF THE INVENTION

The self-locking, holdback cleat of the present invention allows an aircraft to taxi into position and automatically latch itself for the purpose of restraining the aircraft during high-power, engine run-ups either prior to take-off or for maintenance. Essentially the invention includes a male member attached to the aircraft and a female member attached to the ground or deck of a ship. The female member has a labyrinth which guides the male member into locking engagement therewith. Although the cleat is designed as a holdback device for aircraft other applications would include such things as a seat belt latch, a cargo tie-down, and a lifting-hoist attachment. The cleat may be utilized anywhere that a positive, self-locking, quick release attachment is required and not subjected to a negative $g$ environment.

An object of the present invention is to automatically restrain an aircraft during high-power, engine run-ups either prior to take off or for maintenance.

Another object of the invention is to eliminate moving parts such as springs, gates, pivots, and buffers from a holdback device.

A further object of the invention is to provide a positive, self-locking, quick-release, attachment device.

Other objects, advantages, and novel features of the present invention will become apparent from the following detailed description of the invention when considered in conjunction with the accompanying drawings.

DESCRIPTION OF THE PREFERRED EMBODIMENT

Figure 1:
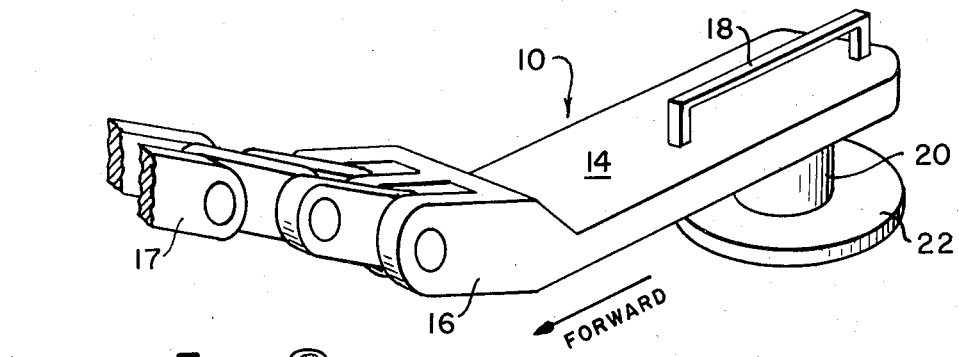
FIG. 1 is a schematic of the male member of the self-locking, holdback cleat.

FIG. 1, which illustrates a portion of the preferred embodiment of the holdback device depicts the male member or shoe 10. The shoe 10 includes a plate 14 which has tangs 16 integrally formed on its front edge. In its preferred use the shoe 10 is attached to the main landing gear of the aircraft by an intermediate, bicycle-type chain 17. The chain 17 attaches to the shoe at the tangs 16. On the top surface of the plate 14 is a handle 18. The handle may be welded to the plate, integrally formed therewith or attached in any other suitable manner. A cylindrical member 20 is attached to the bottom of the plate 14. At the other end of the member 20 is an enlarged portion 22 which in the preferred embodiment takes the form of a disc. Together 20 and 22 form a spool-type button which may be connected to the bottom of plate 14 in any suitable manner or integrally formed therewith. The term connected as used throughout the specification is intended to include the integral formation of two or more parts.

Figure 2:
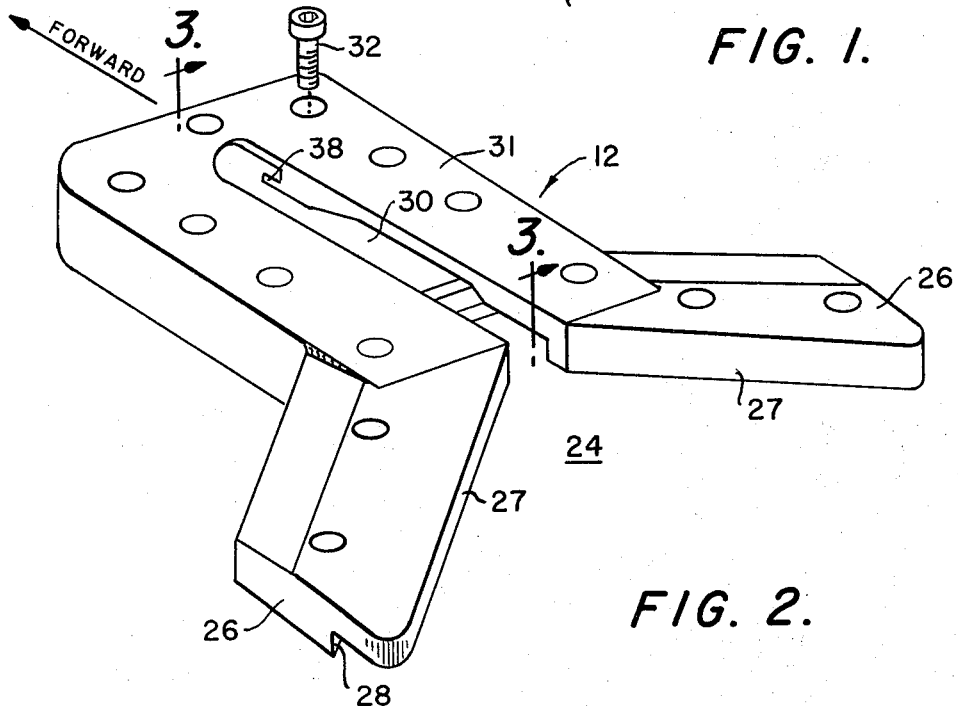
FIG. 2 is a schematic of the female member or deck plate employed in the present device.

FIG. 2 illustrates the female member or deck plate 12 of the holdback device. The deck plate has two wings 26 which serve as guides for the spool-type button mounted on the shoe 10. A guide slot 28 may be cut into each of the wings 26. A top member 31 covers the labyrinth within the deck plate. An elongated passageway 30 extends through substantially the entire length of the top plate 31.

Figure 3:
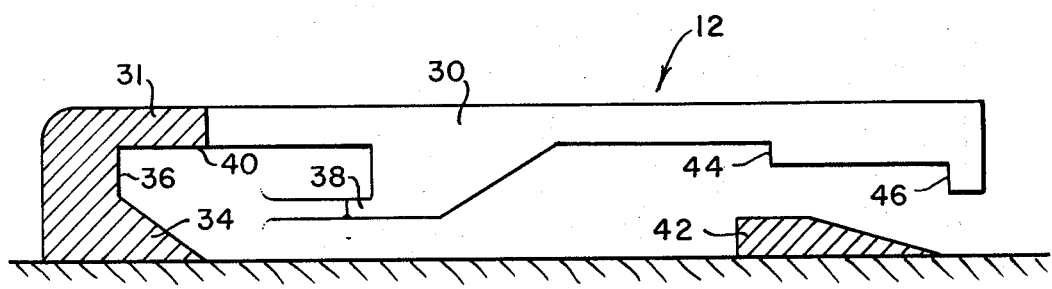
FIG. 3 is a cross-sectional view of a portion of the deck plate taken along line 3—3 illustrating the labyrinth formed in the deck plate.

The operation of the holdback device will now be described. The shoe 10 is attached to the main landing gear of an aircraft by means of the chain 17. During taxi operation, prior to hook-up, the shoe 10 is dragged along the deck or runway surface aft of the aircraft by the chain. To accomplish the hook-up of the holdback cleat, the aircraft is moved forward over the deck plate 12. The shoe is dragged into the throat area 24 of the deck plate 12 between the two wings 26. The enlarged portion 22 on the bottom of the shoe 10 engages the guide slots 28 on the bottoms of the wings 26. The guide slots 28 prevent the disc 22 from jumping over the wings 26. In addition, the wings 26 permit the aircraft and shoe to be misaligned from the center line, by guiding the shoe back into the center line after the enlarged portion 22 engages the wings 26 and as the aircraft continues its forward motion. As the shoe 10 is pulled into the apex of the wings 26, the cylindrical member 20 begins to traverse the passageway 30 in the top plate 31. Continued forward motion of the shoe 10 forces the enlarged member 22 to undergo vertical translation in a rocking motion due to the labyrinth which is better illustrated in the cross-section depicted in FIG. 3. As the enlarged portion 22 approaches the forward end 36 of the labyrinth passage, the enlarged portion 22 is guided upward by a ramp 34. When the enlarged portion 22 engages the forward end or wall 36, the force exerted on the shoe 10 by the aircraft causes the rear of the enlarged portion 22 to rise upward past the forward chamber lip 38 which depends from the top surface 40 of the labyrinth until the top of the enlarged portion 22 is seated flat against top surface 40. The shoe 10 is now fully latched to the deck plate 12. Full thrust of the aircraft can be reacted by the shoe 10 in deck plate 12.

The chamber lip 38 prevents the enlarged portion 22 and the shoe 10 from being released when the aircraft load is relaxed or released in the following manner. When the load is relaxed, the weight of the plate 14 and the tangs 16 and also the chain 17 in the preferred embodiment, cause the forward edge of the enlarged portion 22 to drop earlier than the rear of the enlarged portion 22. When the forward edge of the enlarged portion 22 begins to slide down the ramp 34, the enlarged portion 22 is forced back which pushes the rear of the enlarged portion 22 over the forward chamber lip 38.

At this point, the enlarged portion 22 cannot move further aft or downward and is trapped in the forward chamber of the labyrinth.

In the event of a malfunction of the forward chamber locking sequence, rearward movement of the enlarged portion 22 would be prevented by the aft ramp 42, the intermediate stop 44, and the aft upper stop 46. These three stops form the aft portion of the labyrinth and comprise a safety stop.

When one desires to remove the shoe 10 from the deck plate 12, the shoe 10 is maneuvered out by hand using the handle 18. Using the handle, the rear of the button is pushed downward in the forward chamber and the shoe is moved downward to the rear in order to clear the forward chamber lip 38. By lifting and tilting the shoe, one can maneuver the enlarged portion 22 aft through the aft labyrinth until the shoe 10 is free of the deck plate 12.

The absence of moving parts and loose tolerances makes the holdback cleat extremely durable. Although preferably the device is made of steel, for lighter duty such a system could be constructed of DELRIN or other high strength plastic and utilize molded or cast construction. The various parts of the cleat may be formed integrally where possible or welded together or connected in any other suitable manner.

Obviously many modifications and variations of the present invention are possible in light of the above teachings. It is therefore to be understood that, within the scope of the appended claims, the invention may be practiced otherwise than as specifically described.

What is claimed is:

1. A self-locking, holdback cleat comprising:
   a deck plate having a vertical labyrinth therein covered by a top surface and closed at one end;
   an elongated opening running substantially the length of the top surface;
   a ramp adjacent said one end of the labyrinth;
   a lip depending from the top surface positioned to the rear of said ramp in said labyrinth;
   a plate having a top and a bottom;
   a member connected to the bottom of said plate adjacent to one of the plate's edges;
   an enlarged portion on the unconnected end of the member for cooperating with said labyrinth, ramp and lip when said member is moved through said elongated opening; and
   said plate being balanced in such a manner as to cause the portion of the plate ahead of said member to drop when said plate is placed on a horizontal surface.

2. The cleat of claim 1 further comprising handle means connected to the top of said plate.

3. The cleat of claim 1 wherein said enlarged portion is substantially circular.

4. The cleat of claim 3 wherein said enlarged portion is a disk and said member is shaped substantially cylindrically.

5. The cleat of claim 4 further comprising at least one tang connected to said plate, said tang being connected to a forward edge of said plate and said member being connected adjacent to the rear edge of said plate.

6. The cleat of claim 5 further including a chain connected to said tang.

7. The cleat of claim 6 further including handle means connected to the top of said plate.

8. The cleat of claim 1 further including stop means within said labyrinth in addition to said ramp and said lip for preventing said member from slipping out of said elongated opening.

9. The cleat of claim 8 wherein said enlarged portion is disk-shaped and said member is substantially cylindrical.

10. The cleat of claim 9 further comprising a plurality of tangs on a front edge of said plate and wherein said member is connected to said plate adjacent to its rear edge.

* * * * *